3,200,035
TREATMENT OF SYNTHETIC PRODUCTS,
ESPECIALLY SYNTHETIC FIBERS
Henry Martin and Andreas Ruperti, Basel, Switzerland,
assignors to Ciba Limited, Basel, Switzerland, a company of Switzerland
No Drawing. Filed June 4, 1962, Ser. No. 199,660
8 Claims. (Cl. 167—38.6)

The present invention provides a process for treating synthetic products, especially synthetic fibers, to impart thereto anti-bacterial and anti-mycotic properties, wherein there is applied to or incorporated with the product as active substance a compound of the general formula (I) 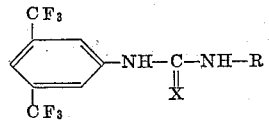

in which X represents oxygen or sulfur, and R represents a phenyl radical which may be substituted by at least one halogen atom or lower alkyl or alkoxy radical or at least one —$CF_3$, —OH, —$NO_2$, —CN, —SCN, —$SO_3H$, —SR', —COR', —COOA,

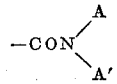

or

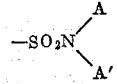

group, in which R' represents a lower alkyl radical, and A and A', each represent a hydrogen atom or a lower alkyl radical.

There is advantageously used as active substance a compound of the general formula (II) 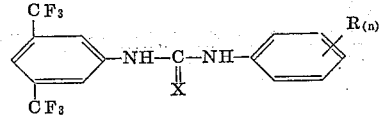

in which R represents a fluorine, chlorine or bromine atom or a lower alkyl or alkoxy radical or a —$CF_3$, —$SO_2NH_2$, —$NO_2$, —CN, —SCN, —COOR', —$SO_2R'$, —COR' or —SR' group, (in which R' represents a lower alkyl radical) $n$ is the whole number 1, 2 or 3, and X represents oxygen or sulfur. Especially advantageous are compounds of the general Formula II, in which X represents a sulfur atom.

The synthetic products to be treated by the process of the invention may be in any desired form, for example, as textile or non-textile fibrous materials or a very wide variety of shaped structures, for example, castings, mouldings, stratified structures, coatings, foils, and also emulsions or solutions. It is specially advantageous to treat synthetic products in the form of fibrous materials by the process of the invention.

The synthetic products to be treated may be made for example, of polyamides, polyesters, polyacrylonitrile, polymers or copolymers of acrylic or methacrylic acid esters, vinyl acetate, vinyl chloride and vinylidene chloride, and of alkyd resins, aldehyde resins, such as phenol, urea or melamine formaldehyde condensation products, polyethylene, polyurethanes, polystyrenes, epoxy-resins, and also of vulcanizable synthetic materials, such as polychloroprene, olefinic polysulfides, polybutadiene or copolymers of butadiene and styrene or of butadiene and acrylonitrile, or of semi-synthetic materials, such as acetylcellulose.

The active substances of the general Formula I may be incorporated with the synthetic products by mixing the former with the synthetic materials, for example, the monomers of precondensates, before they are made into the synthetic products, more especially fibers.

When a plasticizer is used, it is of advantage to add the biocidal additive to the plastic dissolved or dispersed in the plasticizer, for example, dimethyl phthalate, diethyl phthalate, dibutyl phthalate, dicyclohexyl phthalate, trihexyl phthalate, dibutyl adipate, benzyl butyl adipate, or an aliphatic sulfonic acid ester or triglycol acetate. Care must be taken to ensure that the distribution in the synthetic material or synthetic fiber is as uniform as possible. The plastic or synthetic fibers having bactericidal properties can be used for all kinds of articles of use that should be active against a very wide variety of microorganisms, for example, putrefactive bacteria or skin fungi, such articles being for example, mats, handles, door fittings, seats, tread gratings in swimming baths and wall hangings. As fibrous materials which may be treated by the process of the invention there may be especially mentioned those made of polyamides, polyesters or polyacrylonitrile, the treatment of polyamide fibers being especially important. The polyamides are those obtained, for example, by the polycondensation of amino-carboxylic acids or by the polymerization of amino-carboxylic acid lactams, advantageously those of ε-aminocaproic acid or ε-caprolactam. Especially suitable are also polyamides obtained by the polycondensation of diamines with dicarboxylic acids, and in particular the polycondensation product of hexamethylene diamine with adipic acid (nylon). The active substances may be applied to shaped synthetic materials, especially polyamides, for example, fibrous material, by spraying, immersion, or by absorption from an aqueous bath, which advantageously also contains other additions, such as surface-active compounds.

Alternatively, the active substances may be added to the starting materials, especially in the manufacture of polyamides, used for making the synthetic products, before polymerization or polycondensation. For example, they may be added to the ε-caprolactam or to the hexamethylene diamine adipate. When polyamides are to be treated before the melting operation, it is of advantage to mix the active substance homogeneously with the polyamide. After polymerization, the polyamide is usually stored in the form of anhydrous chips. A very good protective action is obtained by mixing the chips with a finely pulverized compound of the general Formula I in a ball mill.

The active substances may also be added with success to the polyamide spinning melt. An especially advantageous form of the process is to treat nylon, for example, nylon filaments, yarns, hanks and fabrics, with a compound of the general Formula I from an aqueous bath, for example, by the absorption method. In this case it is especially advantageous to use those compounds of the general Formula I in which X represents a sulfur atom.

The fact that the aforesaid treatment of nylon produces an active and durable antimicrobic finish on synthetic fibers, especially on nylon, could not have been expected, since the treatment of nylon by the absorption method in an aqueous bath with the known 3:4:4'-trichlorocarbanilide as active substance imparts practically no antimicrobic properties to the nylon.

The antibacterial action resulting from the process of the invention is not confined to the treated product, for example, to the synthetic fibers, but extends to the immediate surroundings of the treated material. For example, fabrics made of synthetic fibers treated by the process of the invention or from such fibers in admixture with, for example, wool or cotton, or packaging materials made from plastics treated by the process of the invention, have a disinfecting action on the surrounding materials. For example, textile materials made of synthetic fibers treated by the process of the invention, or of mixtures of such fibers with other fibers, give effective protection against unpleasant body odor as caused by micro-organisms.

It is especially important that the compounds used in the invention do not lose their bactericidal and fungicidal action even in the presence of proteins or soaps. The new compounds have no disturbing odor and are well tolerated at least by healthy skin.

It is also an advantage of the compounds of the general Formula I that, when used in the concentration necessary for imparting anti-parasitic protection to plastics or synthetic fibers, they do not cause toxic side-effects. Of special interest is the durability of the antibacterial and antimycotic action imparted to the treated products, for example, it is surprisingly resistant to the action of water and sunlight.

The antimicrobic action imparted by the process of the invention affects a wide range of bacteria, and the action against gram-positive bacteria is specially pronounced. The antimycotic action also extends over a wide range and embraces, for example, both Phycomycetes, such as Mucoraceae, and Eumycetes, especially Ascomycetes, such as Aspergillaceae.

The compounds of the general Formula I can be made by methods in themselves known.

For example, a compound of the general formula

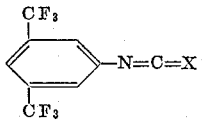

in which X represents O or S, is reacted with a compound of the general formula

NH$_2$—R in which R has the meaning given with reference to Formula I, or a compound of the general formula

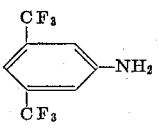

is reacted with a compound of the general formula

R—N=C=X in which R and X have the meanings given above.

The production and characteristic properties of some examples of active substances having the general Formula I are described below.

(1)                (A)

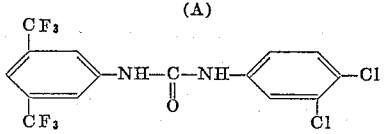

16.2 grams of 3:4-dichloraniline are dissolved in 150 cc. of acetonitrile. To this solution is added a solution of 25.5 grams of 3:5-bis-trifluoromethyl-phenyl-isocyanate (boiling at 63° C. under 14 mm. Hg) in 25 cc. of acetonitrile, while stirring vigorously. After a short time the condensation product of the above formula precipitates. 25 cc. of acetonitrile are stirred into the reaction mixture, and stirring is continued for a few hours. The 3:5 - bis - trifluoromethyl - 3′:4′ - dichlorocarbanilide is isolated by suction filtration, washed with acetonitrile, and dried in vacuo. The yield of crude substance is 36 grams, the product having a melting point of 223 to 224° C. Its melting point after recrystallization from acetonitrile is 227° C. The following compounds can be obtained in an analogous manner:

(2) 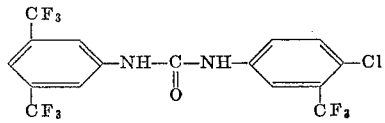

Melting at 177 to 178° C. when recrystallized from chlorobenzene.

(3) 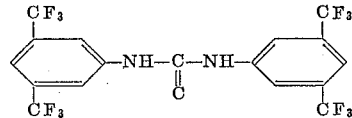

Melting at 253 to 256° C. when recrystallized from nitromethane.

(4) 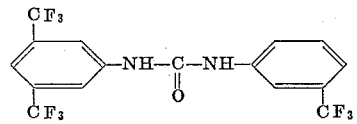

Melting at 165 to 167° C. when recrystallized from chlorobenzene.

(5) 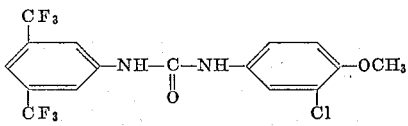

Melting at 188 to 190° C. when recrystallized from acetonitrile.

(6) 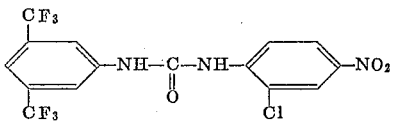

When crystallized from acetonitrile in the presence of animal charcoal, the above 3:5-bis-trifluoromethyl-2′-chloro-4′-nitrocarbanilide precipitates in the form of almost colorless long needles arranged radially, and melts at 211 to 212° C.

(7) 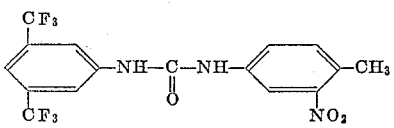

Melting at 215 to 217° C. (when recrystallized from nitromethane).

(8) 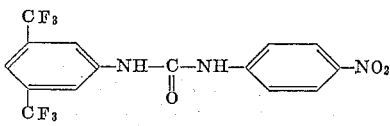

The above 3:5-bis-trifluoromethyl-4′-nitro-carbanilide is a yellow powder in the form of fine crystals that melts at 220 to 225° C. and a second time at 300 to 305° C.

(9) 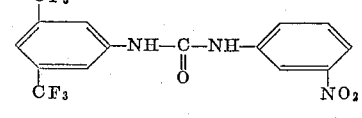

Melting at 230 to 232° C.

(10) 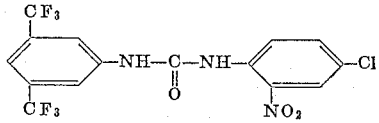

Melting at 204 to 206° C.

(11) 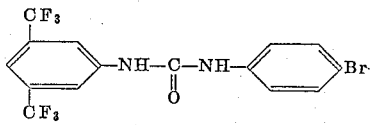

Melting at 224 to 225.5° C. when recrystallized from acetonitrile.

(12) 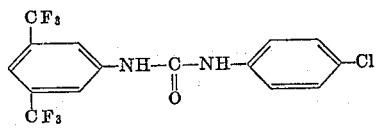

Melting at 214.5 to 215.5° C. when recrystallized from acetonitrile.

(13) 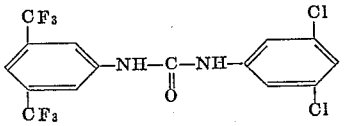

Melting at 219 to 219.5° C. when recrystallized from acetonitrile.

(14) 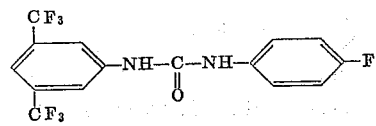

Melting at 213 to 214° C. when recrystallized from acetonitrile.

(15) 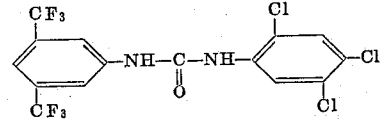

The above 3:5-bis-trifluoromethyl-2':4':5'-trichlorocarbanilide melts at 227 to 228° C. when recrystallized from acetonitrile, then solidifies at 229° C. and sublimes at 270 to 275° C.

(16) 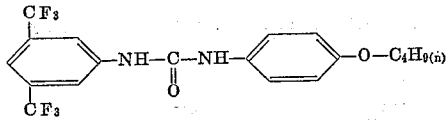

Melting at 195 to 195.5° C. when recrystallized from acetonitrile.

(17) 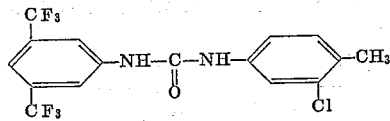

Melting at 230 to 231° C. when recrystallized from acetonitrile.

(18) 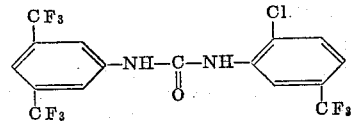

Melting at 225 to 226° C. when recrystallized from acetonitrile.

19) 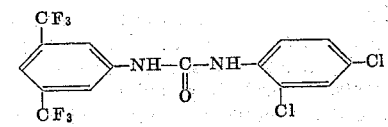

Melting at 192 to 194° C. when recrystallized from acetonitrile.

(20) 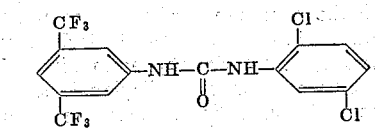

Melting at 225.5 to 227° C. when recrystallized from acetonitrile.

(21) 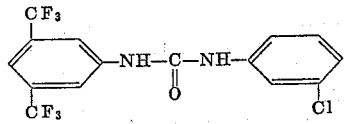

Melting at 175 to 176° C. when recrystallized from acetonitrile.

(22) 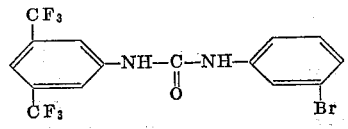

Melting point 174 to 175° C. (when recrystallized from nitromethane and washed with chloroform).

(23) 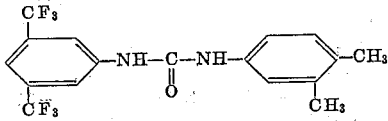

Melting at 185.5 to 186.5° C. when recrystallized from acetonitrile.

(24) 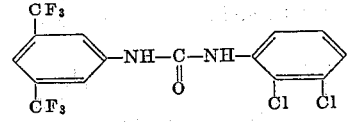

Melting at 222.5 to 223.5° C. when recrystallized from acetonitrile.

(25) 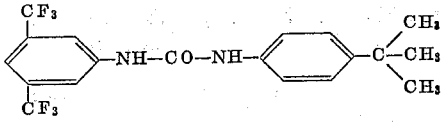

Melting at 167 to 168° C.

(26) 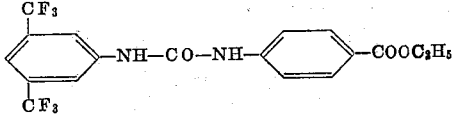

Melting at 230 to 231° C. when recrystallized from acetonitrile.

(27) 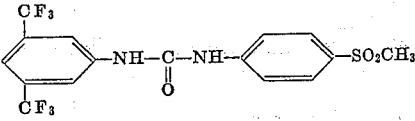

Melting at 224 to 225.5° C. when recrystallized from acetonitrile.

(28) 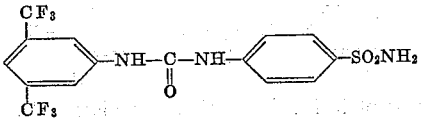

Melting at 228 to 230° C. when recrystallized from acetonitrile.

(29) 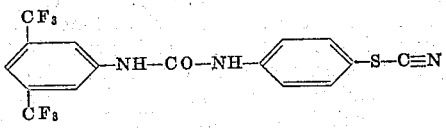

Melting at 204 to 205° C. when recrystallized from acetonitrile.

(30) 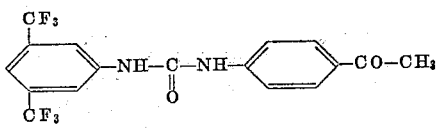

Melting at 238 to 239° C. when recrystallized from butanol and washed with acetonitrile.

(31) 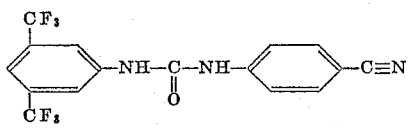

Melting at 252 to 253° C. when recrystallized from acetonitrile.

(32) 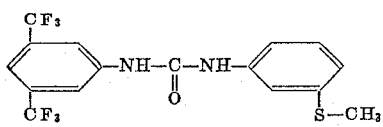

The above 3:5-bis-trifluoromethyl-3'-thiomethyl-carbanilide precipitates slowly from the reaction mixture at 60° C. Melting at 158 to 159.5° C. when recrystallized from acetonitrile.

(33) 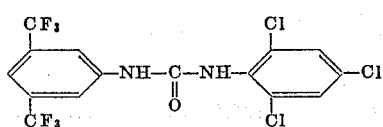

The above compound melts at 225 to 227° C., then solidifies at 229° C. and sublimes at approximately 292° C.

(34) 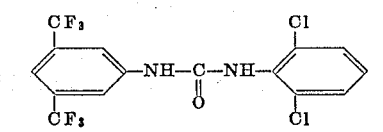

Melting at 227° C. when recrystallized from acetonitrile,

(35) 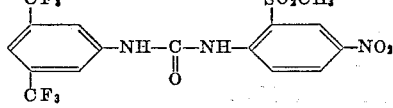

Melting at 227 to 230° C.

(36) 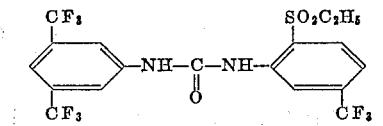

Melting at 173 to 175° C.

(37) 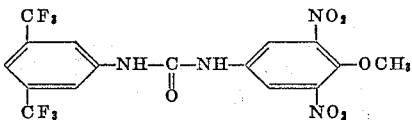

Melting at 226 to 228° C.

(B)

(1) 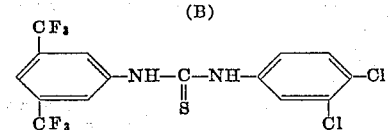

16.2 grams of 3:4-dichloraniline are dissolved in a little acetonitrile, and the solution so obtained is added to 27 grams of 3:5 - bis-trifluoromethyl-phenylisothiocyanate (boiling at 83° C. under 12 mm. Hg). The temperature of the reaction mixture rises in a short time to 82° C.; the reaction mixture is kept on a boiling water bath for 1 hour, and is then evaporated in vacuo. 3:5-bis-trifluoromethyl-3':4'-dichloro-thiocarbanilide remains behind as a solid mass, which is then recrystallized from benzene. The melting point of the purified product is 138 to 139° C. The following compounds are obtained in similar manner:

(2) 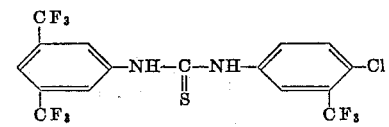

Melting at 138.5 to 139° C. when recrystallized from cyclohexane.

(3) 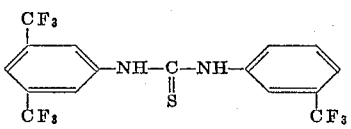

Melting at 133 to 134° C. when recrystallized from cyclohexane.

(4) 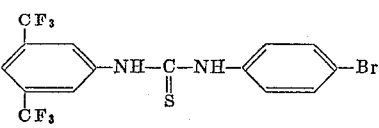

Melting at 163 to 164° C. when recrystallized from benzene/cyclohexane.

(5) 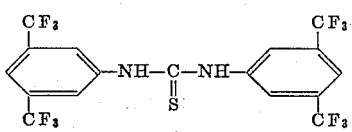

Melting at 184.5 to 186° C. when recrystallized from nitromethane.

(6) 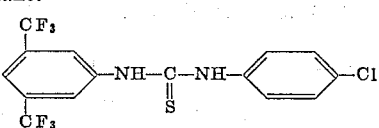

Melting at 150 to 151° C. when recrystallized from benzene/cyclohexane.

(7) 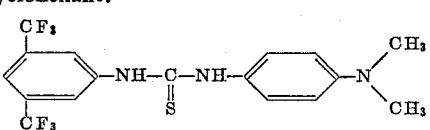

Melting at 167.5 to 170° C. when recrystallized from benzene.

(8) 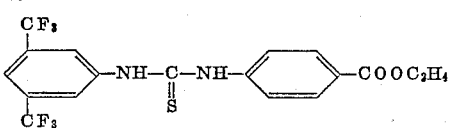

Melting at 147.5 to 148° C. when recrystallized from acetonitrile.

(9) 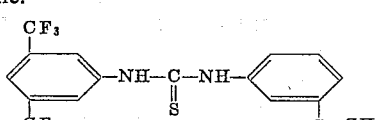

Melting at 125 to 127° C. when recrystallized from benzene/cyclohexane.

(10) 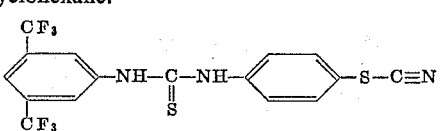

Melting at 122° C. when recrystallized from acetonitrile.

Compounds of the general Formula I can be used alone or in admixture with other additions, such as other antimicrobically active substances or with agents giving protection from light, textile assistants, dyestuffs, pigments, matting agents, optical brightening agents, softening agents, anti-oxidants, emulsifying agents, dispersing agents, detergents or wetting agents, or with insecticides or acaricides.

Antimicrobically active substances that may be used together with the compounds of the general Formula I are, for example, 3:4-dichlorobenzyl alcohol, cetyl-pyridinium chloride, cetyl-trimethyl-ammonium bromide, tetramethyl-thiuram-disulfide, salicylanilides, dichlorosalicylanilides, dibromosalicylanilides, tribromosalicylanilides, tetrachlorosalicylanilides, or 2:2′-dihydroxy-3:5:6-3′:5′:6′-hexachloro-diphenylmethane.

Preparations which contain compounds of the general Formula I can be made up in a very wide variety of forms, for example, as pastes, powders, emulsions, suspensions, solutions or sprays.

The preparations may be in the form of emulsion concentrates, pastes or wettable powders that can be diluted with water to form aqueous solutions ready for use. Non-ionic products may be used as emulsifying or dispersing agents, for example, condensation products of ethylene oxide with aliphatic alcohols, amines or carboxylic acids containing a long chain hydrocarbon radical of 10 to 30 carbon atoms, such as a condensation product of octadecyl alcohol with 25 to 30 mols of ethylene oxide, or of commercial oleylamine with 15 mols of ethylene oxide, or of para-nonyl-phenol with 9 mols of ethylene oxide, or dodecyl mercaptan with 12 mols of ethylene oxide. As anionic emulsifying agents there may be used, for example, the sodium salt of the dodecyl-alcohol sulfuric acid example, the sodium salt of the dodecyl-benzene sulfonic acid, the potassium or triethanolamine salt of oleic acid or abietic acid or of mixtures of these acids, or the sodium salt of petroleum sulfonic acid. As cationic dispersing agents there may be used quaternary ammonium compounds, such as cetyl-pyridinium bromide or dihydroxyethyl-benzyl-dodecylammonium chloride.

By mixing the compounds of the Formula I with detergents or surface-active substances there are obtained washing or cleaning preparations for synthetic fibers, especially nylon, possessing an excellent anti-bacterial or antimycotic action. The compounds of the general Formula I may, for example, be incorporated in soaps or mixed with soapless detergents or surface-active substances, or they may be combined with mixtures of soaps and soapless substances having a detergent action.

As examples of soapless compounds having a detergent action that can be used in admixture with the new compounds there may be mentioned: condensation products of fatty acids with methyl-taurine, condensation products of fatty acids with hydroxyethane sulfonic acid salts, and condensation products of fatty acids with proteins.

The compounds of the general Formula I can also be used in heavy-duty detergent preparations for synthetic fibers or fabrics thereof, if desired, in admixture with a condensed phosphate, for example, 20 to 50% of an alkali metal tripolyphosphate, or in the presence of an organic lyophilic polymer that enhances the soil-suspending power of the washing liquor, for example, in the presence of an alkali salt of carboxy-methyl-cellulose.

The following examples illustrate the invention, the parts and percentages being by weight:

*Example 1*

The bactericidal action on *Staphylococcus aureus* of an extremely fine dispersion of the compound of the formula

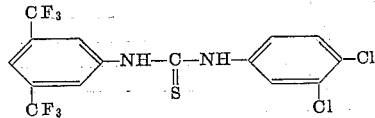

prepared by mechanical disintegration in the presence of a condensation product of naphthalene sulfonic acid with formaldehyde, was tested in the presence of 50 times its weight of a soap made from olive oil and having a high fatty acid content (so-called "Marseilles soap") with glucose broth by the tube dilution test. 24 hours after inoculation with *Staphylococcus aureus*, the culture was transferred to agar and the growth was observed after a further 24 hours.

The compound under test proved to be a bactericide under the condition described above, even at a dilution of 0.1 part per million of active substance.

Similar results were obtained when the compounds of the formulae

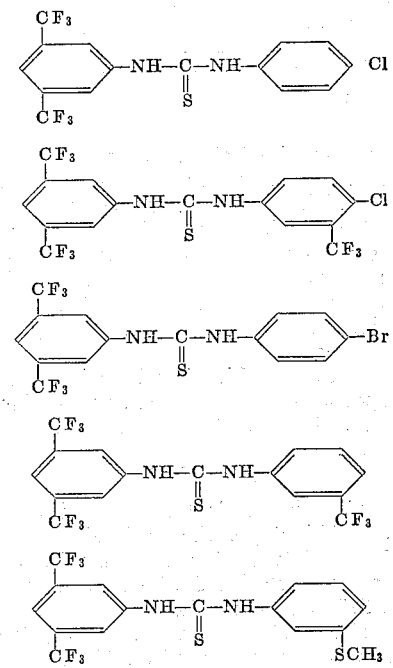

were used as active substances under the experimental conditions described above.

Compounds 5, 7, 8 and 10 listed above under (B) also exhibit a pronounced antibacterial action under the above experimental conditions, and in the case of the compounds listed under (A), especially compounds 1, 2, 4, 11 and 32, exhibit a distinct antimicrobic action.

*Example 2*

4 grams of a nylon fabric were immersed in 100 ml. of an aqueous solution containing 0.02 gram of the compound of the formula

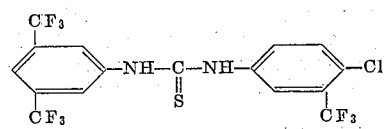

which had been mechanically converted into a finely dispersed form with the assistance of the dispersing agent described in Example 1, and uniformly moved therein. The nylon fabric was then squeezed and dried without first being rinsed.

Circular pieces having a diameter of 6 mm. were then stamped out of the fabric so treated, and were tested as to their efficacy against *Staphylococcus aureus* by the dish test. The pieces were placed in the centre of Petri dishes into which had been poured a mixture of 50% of beer wort and 2% of agar that had been inoculated with Staphylococcus. After an incubation period of 24 hours at 37° C., the zone of inhibition (difference between diameter of clear zone and the 6 mm. diameter of the piece) was 7 mm. in the case of the compound under test.

A zone of inhibition of the same diameter was obtained under the same experimental conditions when the compound of the formula

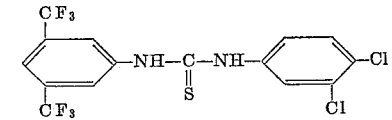

was used as active substance.

A zone of inhibition having a diameter of 5.5 mm. was obtained when the compound of the formula

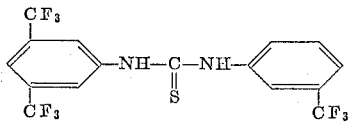

was used.

The compounds listed above under (B), for example, No. 6, and those listed under (A), for example, Nos. 1 and 2, also exhibited a distinct antibacterial action.

On the other hand, an experiment carried out under the same conditions with the known 3:4:4'-trichlorocarbanilide produced virtually no zone of inhibition, that is to say, the aforesaid compound proved to be unsuitable for imparting an antimicrobic effect to nylon by the absorption method.

A nylon fabric, in which had been incorporated one of the compounds of the invention as an addition to the spinning melt, also exhibited an antibacterial and antimycotic action.

*Example 3*

50 parts of a vinyl resin lacquer consisting of 240.4 parts of a stabilized polyvinyl chloride (228 parts of "Vinylite VMCH" [trade name] of the Union Carbide and Carbon Corp., stabilized with 12.4 parts of "Stabilisator No. 52" of Advance Solvents), and 24.6 parts of dioctyl phthalate, 367.5 parts of methyl ethyl ketone and 267.5 parts of toluene are mixed for 10 minutes at room temperature with a solution of 0.2 gram of the compound of the formula

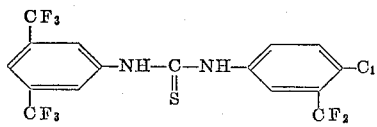

in 20 parts of acetone.

The mixture so obtained can be used in the usual manner for the production of a very wide variety of coatings, which possess an active antibacterial and antimycotic action.

By coating tinfoil with a wet film 0.2 mm. thick of the above lacquer by means of a film-forming device, and then drying the film for 5 minutes at 120° C., there is obtained packing material possessing excellent preserving properties, which is suitable for protecting perishable goods.

What is claimed is:

1. A process for treating a member selected from the group consisting of a synthetic plastic mass and a synthetic fibrous material for imparting thereto antibacterial and antimycotic properties, wherein there is applied to said products an antibacterial and antimycotic amount of a compound of the formula

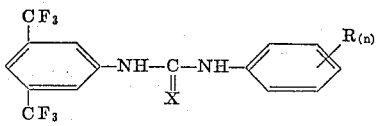

in which R represents a member selected from the group consisting of halogen, lower alkyl, alkoxy, $-CF_3$, $-SO_2NH_2$, $-NO_2$, $-CN$, $-SCN$, $-COOR'$, $-SO_2R'$, $-COR'$ and $-SR'$, in which $R'$ stands for lower alkyl, $n$ represents a whole number of at most 3 and X represents a member selected from the group consisting of oxygen and sulfur.

2. A process for treating plastic masses for imparting thereto antibacterial and antimycotic properties, wherein there is applied to said materials an antibacterial and antimycotic amount of a compound of the formula

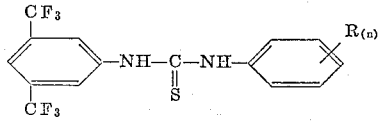

in which R represens halogen and $n$ represents a whole number of at most 3.

3. A process for treating nylon fibrous materials for imparting thereto antibacterial and antimycotic properties, wherein there is applied to said materials an antibacterial and antimycotic amount of the compound of the formula

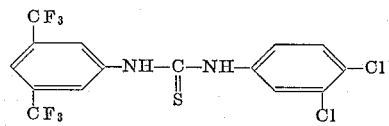

by absorption of this compound on the nylon materials from an aqueous bath.

4. A process for preparing shaped synthetic plastic materials having antibacterial and antimycotic properties, wherein there is applied to said materials an antibacterial and antimycotic amount of the compound of the formula

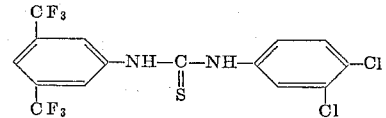

by incorporating this compound into the plastic materials before they are shaped.

5. Synthetic plastic masses having antibacterial and antimycotic properties and containing an antibacterial and antimycotic amount of a compound of the formula set forth in claim 1.

6. Synthetic fibrous materials having antibacterial and antimycotic properties and containing an antibacterial and antimycotic amount of a compound of the formula set froth in claim 2.

7. Polyamide materials having antibacterial and antimycotic properties and containing an antibacterial and antimycotic amount of a compound of the formula set forth in claim 3.

8. Nylon fibrous materials having antibacterial and antimycotic properties and containing applied thereto an antibacterial and antimycotic amount of a compound of the formula set forth in claim 3.

References Cited by the Examiner

UNITED STATES PATENTS

| | | | |
|---|---|---|---|
| 2,745,874 | 5/56 | Schetty et al. | 167—38.6 |
| 2,867,659 | 1/59 | Model et al. | 167—30 |
| 3,034,957 | 5/62 | Smith et al. | 167—38.6 |
| 3,058,881 | 10/62 | Wilde | 167—38.6 |
| 3,082,118 | 3/63 | Shaw et al. | 167—38.6 |

JULIAN S. LEVITT, *Primary Examiner.*

F. CACCIAPAGLIA, JR., *Examiner.*